United States Patent
Sagel et al.

(10) Patent No.: US 6,773,817 B1
(45) Date of Patent: Aug. 10, 2004

(54) ANTIABRASION COATING

(75) Inventors: Aléxander Sagel, Blochingen (DE); Bertram Kopperger, Hebertshausen (DE); Erwin Bayer, Dachau (DE); Wilfried Smarsly, München (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 09/868,597

(22) PCT Filed: Dec. 17, 1999

(86) PCT No.: PCT/DE99/04017

§ 371 (c)(1),
(2), (4) Date: Oct. 9, 2001

(87) PCT Pub. No.: WO00/37713

PCT Pub. Date: Jun. 29, 2000

(30) Foreign Application Priority Data

Dec. 22, 1998 (DE) .......................... 198 59 477

(51) Int. Cl.[7] .............................. B32B 15/00; F03B 3/12
(52) U.S. Cl. .................. 428/457; 428/458; 428/297.4; 428/660; 428/674; 428/937; 416/241 R
(58) Field of Search ................................ 428/457–468, 428/650–654, 670, 674, 660, 679, 680, 937, 425.9, 469, 297.4; 416/241 R; 148/403, 902, 489, 537, 538, 552

(56) References Cited

U.S. PATENT DOCUMENTS

| | | |
|---|---|---|
| 5,389,226 A | 2/1995 | Scruggs et al. |
| 5,472,920 A | * 12/1995 | Dubois et al. |

FOREIGN PATENT DOCUMENTS

| | | |
|---|---|---|
| DE | 38 14 444 | 11/1988 |
| DE | 38 00 454 | 7/1989 |
| DE | 689 03 0073 | 7/1990 |
| DE | 42 16 150 | 11/1992 |
| EP | 0 354 391 | 2/1990 |
| EP | 0 576 366 | 12/1993 |
| JP | 10-096077 | 4/1998 |
| WO | 92/13111 | 8/1992 |

OTHER PUBLICATIONS

Chemical Abstracts, vol. 123, No. 6, Abstract No. 62895, XP–002136889, Aug. 7, 1995, English translation of the International Search Report provided.

Chemical Abstracts, vol. 113, No. 6, Abstract No. 50666, XP–002136890, Aug. 6, 1990, English translation of the International Search Report provided.

Database WPI, Section Ch, Week 198941, Derwent Publications Ltd., London, GB, AN 1989–293337, XP–002136891, English translation of the International Search Report provided.

Metall, vol. 36, Aug. 1982, pp. 841–853, Described in specification.

U. Gonster, et al., "Metallwissenschaft und Technik", Metall, vol. 36, Aug. 1982, pp. 841–853, Described in specification.

* cited by examiner

*Primary Examiner*—Jennifer McNeil
(74) *Attorney, Agent, or Firm*—Kenyon & Kenyon

(57) ABSTRACT

A wear-resistant layer is applied to a surface, which is to be protected, of a component which is subjected to mechanical and/or fluidic loads and substantially consists of amorphous or amorphous-nanocrystalline metals. The layer for protecting against abrasive or erosive wear substantially consists of an Ni—W-base alloy or substantially consists of an alloy based on Cu—Al—Ti(or —Ta or —Zr) or Pd—Cu—Si or Pt—Al—Si or Ta—Si—N, or substantially consists of an alloy of Al, at least one rare earth and a transition metal, such as Cu or Ni or Co.

16 Claims, 3 Drawing Sheets

ANTIABRASION COATING

FIELD OF THE INVENTION

The present invention relates to a wear-resistant layer which is applied to a surface, which is to be protected, of a component which is subjected to mechanical and/or fluidic loads and substantially comprises amorphous or amorphous-nanocrystalline metals.

BACKGROUND INFORMATION

Components which are subjected to mechanical stresses from friction or around which media flow are generally subject to abrasive or erosive wear. In the field of internal-combustion engines, this wear occurs, for example in the case of piston engines, on valves, pistons or the like. In the field of gas turbines, furthermore, the components around which media flow need to be protected against erosion and corrosion.

The journal Metall, volume 36 (August 1982), pages 841 to 853, describes welding amorphous metal strips, due to their corrosion resistance and their high hardness and resistance to abrasion, to turbine blades of aircraft engines. Amorphous iron-base metals and the production of the metal strips using continuous quenching methods may be used for this purpose.

German Published Patent Application No. 38 00 454 describes a process for the production of corrosion-resistant and wear-resistant layers and shaped bodies made from metallic, amorphous materials, in which an amorphous powder which can be processed further by powder metallurgy is produced from metallic alloys, and this powder is then applied to the substrate, for example, by plasma spraying.

German Published Patent Application No. 38 14 444 describes amorphous alloys which are highly resistant to corrosion and substantially comprise at least one element selected from the group consisting of Ta and Nb and in addition may have at least one element selected from the group consisting of Ti and Zr, with Cu also always being a constituent. Numerous Cu-base alloys made from these elements are described, and these alloys are applied to a substrate by spray deposition.

German Published Patent Application No. 42 16 150 describes highly corrosion-resistant amorphous alloys based on Ti or Zr and Cr, which are described as having a high resistance to corrosion and wear and are applied to a substrate by sputtering or atomization.

German Published Patent Application No. 689 03 073 describes a thin, corrosion-resistant and heat-resistant film made from an aluminium alloy and a process for its production, in which the alloy contains, as further elements, Ni, Zr or Y and is applied by thin-film formation techniques, such as cathode sputtering, vacuum deposition or ion plating, to a substrate, such as, for example, a wire or a filament.

U.S. Pat. No. 5,389,226 describes electrodeposition of an amorphous microcrystalline (including nanocrystalline) Ni—W alloy on a substrate, such as a part of an internal-combustion engine, the coating having a high hardness and being able to withstand wear and corrosion.

Japanese Published Patent Application No. 10096077 describes a gradient coating with a thickness of over 0.1 mm which is produced from an Al alloy, an element selected from the group consisting of Cr, Mn, Fe, Co, Ni, Cu, Ti, Zr and Y, rare earths and a misch metal by electron beam deposition on a substrate, the hardness of the coating being varied by the ratio between Al and the element from the group.

Chemical Abstracts XP002136889 describes the coating of a copper wire, which has a first, amorphous layer of an Ni—P alloy, with an amorphous Pd—Cu—Si alloy by a laser, by which electrical contact elements are describes as becoming better able to withstand dissolution and abrasion.

It is an object of the present invention to provide a wear-resistant layer, which protects component surfaces that are acted on mechanically, for example, by friction, or fluidically against wear and increases the service life of these components. Suitable alloys are provided.

According to the present invention, the layer comprises an alloy based on Cu—Al—Ti(or —Ta or —Zr) or Pt—Al—Si or Ta—Si—N, at least one rare earth and a transition metal, such as Cu or Ni or Co.

The advantage of wear-resistant layers of this type is that their alloys, unlike conventional crystalline metals, due to their amorphous or vitreous structure, do not have any grain boundaries and therefore have a high resistance to abrasive or erosive wear and have a high elastic restoring capacity.

In one example embodiment of the present invention, the layer substantially comprises an Ni—W-base alloy, in which case the alloy may be Ni-rich and contain only between 20 and 40 atomic % of W. To achieve the amorphous or amorphous-nanocrystalline metal structure, the alloy may inexpensively be electrodeposited on the surface of the component to be coated. An alloy of this type which is present in the form of amorphous or amorphous-nanocrystalline metal has a high hardness, in particular due to the element W, and is extremely wear-resistant and temperature-resistant.

In an alternative example embodiment of the present invention, the wear-resistant layer may substantially comprise an alloy based on Cu—Al—Ti (or —Ta or —Zr) or Pt—Al—Si or Ta—Si—N, in which case the layer may be applied to the surface of the component by PVD (physical vapor deposition) processes, and in particular Ta—Si—N is suitable for applications at elevated temperatures.

The wear-resistant layer may substantially comprise an alloy based on Zr—Ti, in which case the amorphous or amorphous and nanocrystalline metal structure is produced by applying the alloy from the melt.

Alternatively, the wear-resistant layer may substantially comprise an alloy based on Fe—Cr—B, in which case the alloy is preferably iron-rich and contains approximately 70 atomic % of Fe. A wear-resistant layer of this type may be applied to the surface of the component by, for example, thermal spraying processes.

In a further example embodiment of the present invention, the wear-resistant layer may substantially comprise an alloy of Al, at least one rare earth and a transition metal, such as for example Cu or Ni or Co.

The layer may be applied to the root of a blade of a gas turbine to protect against fretting, since in that region, while the gas turbine is operating, a high level of frictional wear with high-frequency alternating loads with low amplitudes occurs.

In another example embodiment of the present invention, the wear-resistant layer may be applied to a component which substantially comprises fiber-reinforced plastic (FRP), in order to protect this component against erosion. In the case of FRP blades for compressors of gas turbines, examples of conventional arrangements for protecting against erosion are metallic foils, felts, wire meshes or coating materials, which have drawbacks in terms of the manufacturing costs or the required service life and are not yet usable.

In an alternative example embodiment of the present invention, the wear-resistant layer may be applied to a rotor carrier or rotor ring, which is configured as a disc or a ring, of an integrally bladed FRP rotor of a gas turbine, as protection against abrasive and/or erosive wear.

In an alternative use, the wear-resistant layer is applied to a component of a reciprocating engine, such as, for example, a valve, a camshaft, a crankshaft, a piston ring or a piston pin.

DETAILED DESCRIPTION

Figure 1:
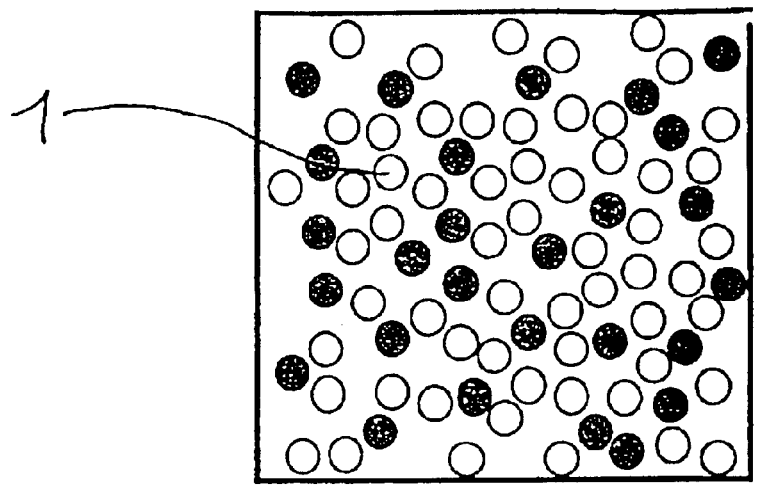
FIG. 1 schematically illustrates the structure of an amorphous metal.

FIG. 1 schematically illustrates the microstructure of an amorphous metal, in which the elements are not, as is the case of Ti, for example, arranged in a fixed, crystalline structure, but rather are arranged randomly without a regular crystal lattice (region 1). The grain boundaries which are absent result in amorphous or amorphous and nanocrystalline metals having a high resistance to wear and a high Vickers hardness. Moreover, unlike crystalline metals, there is no embrittlement and strain hardening.

Figure 2:
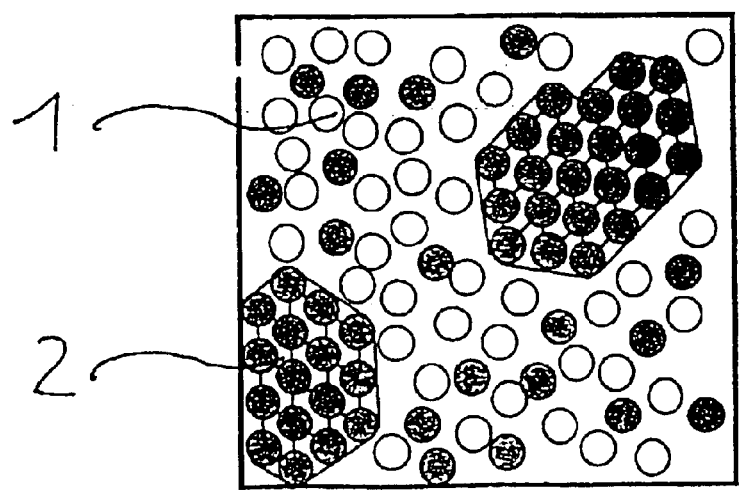
FIG. 2 schematically illustrates the structure of an amorphous and nanocrystalline or partially crystalline metal.

FIG. 2 schematically illustrates the structure of an amorphous and nanocrystalline or partially crystalline metal, in which the elements are in part arranged randomly in an amorphous structure (region 1) and in part are in the form of relatively small regions with a crystalline structure (region 2). Amorphous and nanocrystalline or partially crystalline metals of this type also have a high resistance to abrasive or erosive wear and have a high Vickers hardness.

Figure 3:
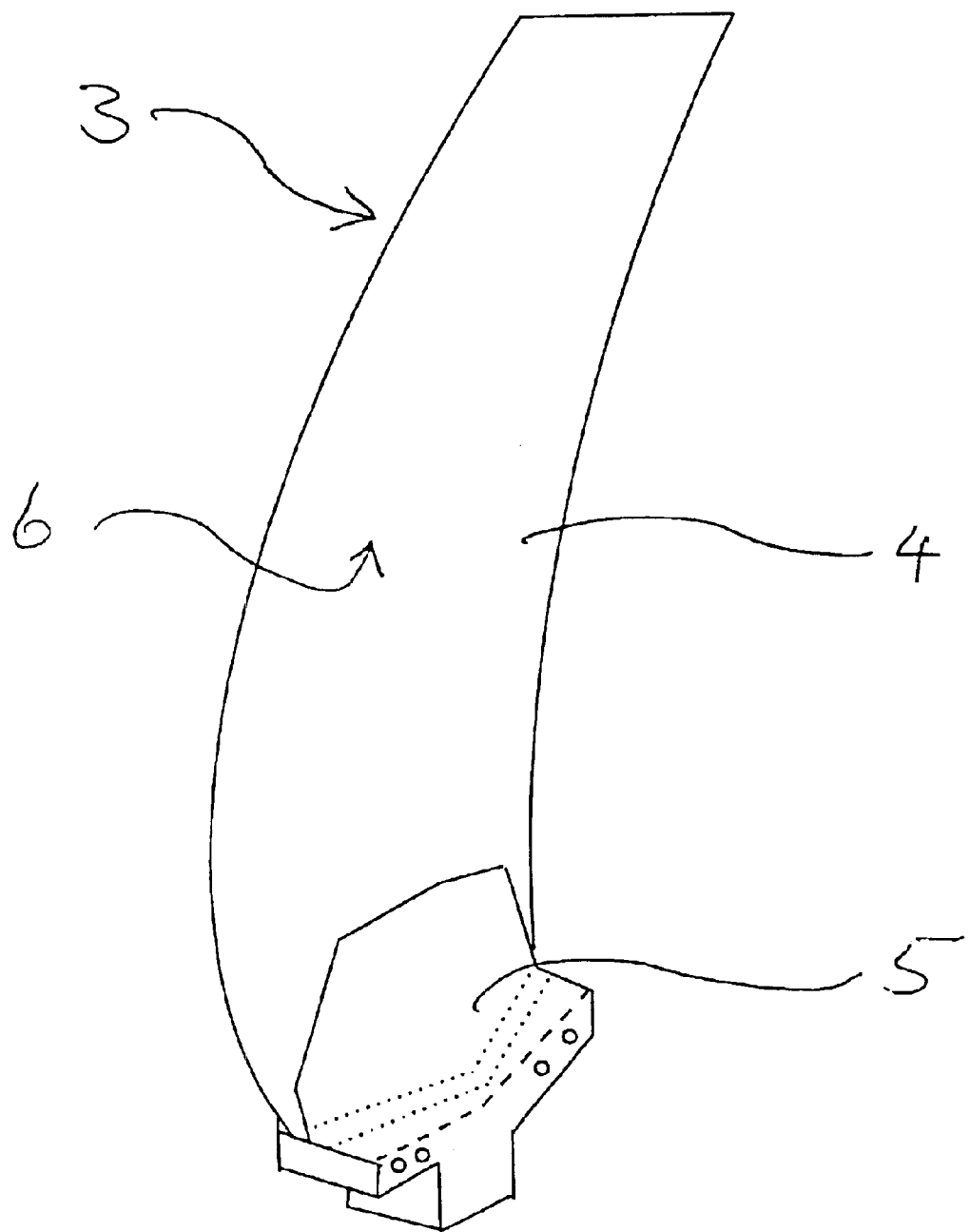
FIG. 3 is a schematic perspective view of an FRP blade with an at example embodiment of the wear-resistant layer according to the present invention.

FIG. 3 is a schematic perspective view of a blade of a gas turbine which is denoted overall by 3 and in which a blade 4 consists of fiber-reinforced plastic and is attached to a metallic blade root 5 consisting of a Ti-base alloy. A blade 3 of this type is used, for example, in a compressor, and its blade root 5 is attached to a rotor ring or rotor carrier releasably or alternatively integrally using a suitable welding process. The fact that the blade 4 is formed from fiber-reinforced plastic has proven advantageous in reducing weight. However, drawbacks include the material's generally inadequate wear resistance to erosion. For this reason, the blade 4 made from fiber-reinforced plastic is completely provided with a wear-resistant layer 6, which substantially comprises amorphous or amorphous and nanocrystalline metals.

In the present configuration, an alloy which substantially comprises Ni—W, is Ni-rich and contains approximately 30 atomic % of W is selected. To form the amorphous or amorphous and nanocrystalline structure, the alloy is applied to the surface of the blade 4 made from carbon fiber-reinforced plastic by electrodeposition. The mechanical properties and the wear resistance of the wear-resistant layer 6 may be set using the parameters temperature, voltage and chemistry of the electrodeposition bath. The hardness of the wear-resistant layer 6 may also be increased by a final heat treatment at temperatures between approximately 100° C. and 500° C. Alternatively, it is also possible for only individual sections of the blade 3, such as the leading edge or the blade tip, to be provided with the wear-resistant layer 6. This layer may also consist of an alloy based on Cu—Al—Ti (or —Ta or —Zr) or Pd—Cu—Si or Pt—Al—Si or Pa—Si—N, since these alloys, in particular in combination with their amorphous or amorphous-nanocrystalline metal structure, are wear-resistant, hard and temperature-resistant.

Figure 4:
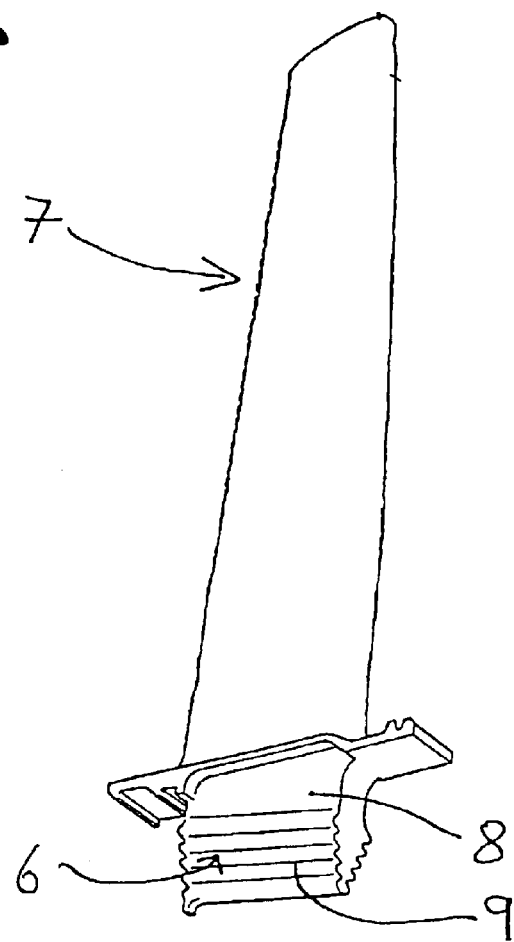
FIG. 4 is a schematic perspective view of a metallic blade with an alternative example embodiment of the wear-resistant layer according to the present invention.

FIG. 4 illustrates a metallic (rotor) blade 7 of a compressor of a gas turbine which has a blade root 8 with a fir-tree profile 9 for releasable attachment to a rotor. The blade is produced by powder metallurgy from Ti—Al. Alternatively, the wear-resistant layer 6 may also be applied to cast or forged blades or other components of a gas turbine. While the gas turbine is operating, fretting often occurs at the root 8 of the blade 7. To avoid the resultant wear and therefore to increase the service life, the blade 7 is protected at its root 8 and in particular in the region of the fir-tree profile 9 with a wear-resistant layer 6 which substantially comprises amorphous or amorphous-nanocrystalline metals. The wear-resistant layer 6 substantially comprises an alloy based on Pd—Cu—Si and is applied to that surface of the blade root 8 which is to be protected against fretting by a PVD process. In addition to its mechanical properties, a wear-resistant layer 6 of this type is also distinguished by its resistance to oxidation. For applications at elevated temperatures, the wear-resistant layer 6 may alternatively consist of an alloy based on Ta—Si—N.

In the present application illustrated in FIG. 4, as an alternative a wear-resistant layer 6 comprising amorphous or amorphous-nanocrystalline metals and made from an alloy based on Fe—Cr—B is also possible, this layer being iron-rich and containing approximately 70 atomic % of Fe. The desired structure of this alloy, which is amorphous at least in regions, may be established during application by thermal spraying.

Figure 5:
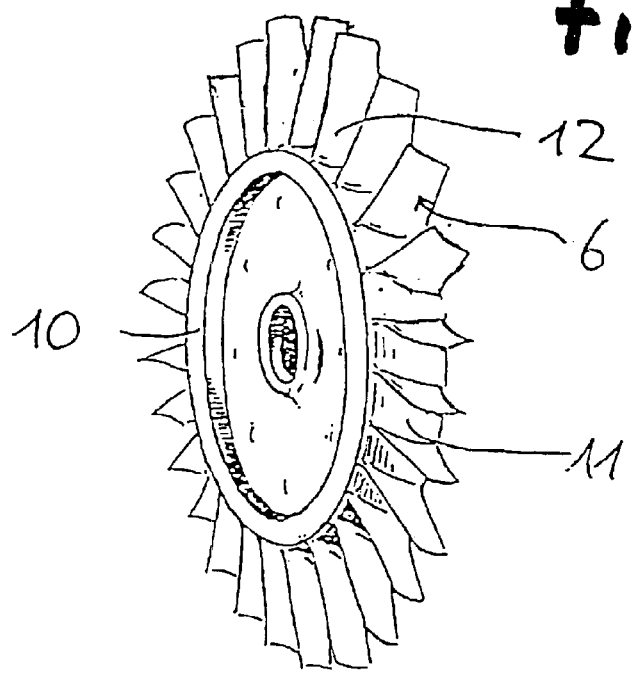
FIG. 5 is a schematic perspective view of an FRP rotor with a further alternative example embodiment of the wear-resistant layer according to the present invention.

FIG. 5 illustrates an integrally bladed rotor 10 of a gas turbine, to the circumferential surface 11 of which a plurality of blades 12, which are generally arranged equidistantly and extend substantially in the radial direction, are attached. A rotor 10 of this type is produced, for example, integrally from carbon fiber-reinforced plastic and has a poor resistance to wear. To improve the resistance to abrasive and erosive wear during operation, the rotor 10 is provided with a wear-resistant layer 6 made from an Ni—W-base alloy, which is Ni-rich, contains approximately 35 atomic % of W and, to form the amorphous or amorphous-nanocrystalline structure, is produced on the surface of the rotor 10 by electrodeposition.

Alternatively, the rotor 10 may, at the abovementioned regions, be coated with a layer 6 of an alloy of Al, at least one rare earth and a transition metal, such as Cu or Ni or Co, since these alloys, in combination with their amorphous or amorphous-nanocrystalline metal structure, are wear-resistant and temperature-resistant.

What is claimed is:

1. A component, comprising:

a wear-resistant layer applied to a surface of the component to be protected, the surface being subjected to at least one of a mechanical load and a fluidic load, the layer including at least one of amorphous metals and amorphous-nanocrystalline metals, the layer including at least one rare earth metal, a transition metal and at least one of a Cu—Al—Ti alloy, a Cu—Al—Ta alloy, a Cu—Al—Zr alloy, and a Pt—Al—Si alloy.

2. The component according to claim 1, wherein the transition metal includes one of Cu, Ni and Co.

3. The, component according to claim 1, wherein the layer is applied to the surface by electrodepositlon.

4. The component according to claim 1, wherein the layer is applied to the surface from a melt.

5. The component according to claim 1, wherein the layer is applied to the surface by a PVD process.

6. The component according to claim 1, wherein the layer is applied to the surface by thermal spraying.

7. The component according to claim 1, wherein the component includes a component of an internal-combustion engine.

8. The component according to claim 1, wherein the component includes a component of a gas turbine around which one of a gas and a hot gas flow.

9. The component according to claim 1, wherein the component includes a blade of a gas turbine, the surface corresponding to at least a portion of a root of the blade, the layer being configured to protect against fretting.

10. The component according to claim 1, wherein the component is formed of a fiber inforced plastic.

11. The component according to claim 1, wherein the component includes at least one of a fiber-reinforced plastic blade and a support configured as one of a disc and a ring of an integrally bladed fiber-reinforced plastic rotor, the at least one of the blade and the support including the surface, the layer being configured to protect against at least one of erosion and corrosion.

12. The component according to claim 1, wherein the layer is metallic.

13. The component according to claim 12, wherein the layer further includes one of a Ti alloy, a Ni alloy, a Co alloy and a Fe alloy.

14. The component according to claim 1, wherein the component includes a tire of a rail-borne vehicle, the tire including the surface.

15. The component according to claim 1, wherein the component includes a component of a reciprocating engine, the component of the reciprocating engine including the surface.

16. The component according to claim 15, wherein the component of the reciprocating includes one of a valve, a camshaft, a crankshaft a piston ring and a piston pin.

* * * * *

UNITED STATES PATENT AND TRADEMARK OFFICE
CERTIFICATE OF CORRECTION

PATENT NO. : 6,773,817 B1
DATED : August 10, 2004
INVENTOR(S) : Alexander Sagel et al.

It is certified that error appears in the above-identified patent and that said Letters Patent is hereby corrected as shown below:

<u>Title page,</u>
Item [75], Inventors, change "Aléxander Sagel" to -- Alexander Sagel --;

<u>Column 2,</u>
Line 17, "Cu–Al–Ti(or –Ta or –Zr)" to -- Cu–Al–Ti (or –Ta or –Ta or – Zr) --;

<u>Column 3,</u>
Line 23, change "with an at example" to -- with an example -- and <u>Column 6,</u>
Line 4, change "component is formed of a fiber inforced plastic" to -- component is formed of a fiber-reinforced plastic --.

Signed and Sealed this

Seventeenth Day of May, 2005

JON W. DUDAS
*Director of the United States Patent and Trademark Office*